US010620671B2

(12) United States Patent
Lai et al.

(10) Patent No.: US 10,620,671 B2
(45) Date of Patent: Apr. 14, 2020

(54) ELECTRONIC DEVICE (71) Applicants: Tzu-Chien Lai, Taipei (TW); Yen-Hsiao Yeh, Taipei (TW)

(72) Inventors: Tzu-Chien Lai, Taipei (TW); Yen-Hsiao Yeh, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/384,918

(22) Filed: Apr. 16, 2019

(65) Prior Publication Data
US 2019/0317557 A1    Oct. 17, 2019

Related U.S. Application Data (60) Provisional application No. 62/657,937, filed on Apr. 16, 2018.

(51) Int. Cl.
*G06F 1/16* (2006.01)
(52) U.S. Cl.
CPC .......... *G06F 1/1662* (2013.01); *G06F 1/1616* (2013.01)
(58) Field of Classification Search
CPC ............................. G06F 1/1615; G06F 1/1616
USPC ........................ 361/679.05, 679.06
See application file for complete search history.

(56) References Cited

U.S. PATENT DOCUMENTS 6,266,241 B1 * 7/2001 Van Brocklin ....... G06F 1/1616
361/679.46
6,353,529 B1 * 3/2002 Cies ..................... G06F 1/1616
248/917
7,215,538 B1 * 5/2007 Chen .................... G06F 1/1616
108/44
7,821,780 B2 * 10/2010 Choy ................... G06F 1/1616
361/679.06
8,310,823 B2 * 11/2012 Stoltz .................. G06F 1/1616
361/679.08
10,402,635 B2 * 9/2019 Chu ..................... F16M 13/005
(Continued)

FOREIGN PATENT DOCUMENTS

| CN | 205450883 | 8/2016 |
| CN | 104181977 | 6/2017 |
| TW | 201251585 | 12/2012 |

OTHER PUBLICATIONS

"Office Action of Taiwan Counterpart Application," dated Nov. 12, 2019, p. 1-p. 4.

*Primary Examiner* — Anthony Q Edwards
(74) *Attorney, Agent, or Firm* — JCIPRNET (57) ABSTRACT

An electronic device includes a first component, a second component, a dual axis module, and a third component. The second component is flipably disposed at the first component. The dual axis module has a first shaft and a second shaft. The second component is pivoted to the second shaft. The third component is pivoted to the first shaft. The electronic device is switched between a first state, a second state, a third state, and a fourth state. During the switching of the first state to the second state, the first shaft is rotatable relative to the first component and the second shaft is non-rotatable. During the switching of the second state to the third state, the first shaft is non-rotatable and the second shaft is rotatable relative to the first component. During the switching of the third state to the fourth state, the first shaft is rotatable relative to the first component and the second shaft is non-rotatable.

17 Claims, 10 Drawing Sheets (56) References Cited

U.S. PATENT DOCUMENTS

2012/0099250 A1* 4/2012 Robinson .............. G06F 1/1615
361/679.01
2018/0188781 A1* 7/2018 Park, Jr. ................ G06F 1/1616

* cited by examiner

ELECTRONIC DEVICE

CROSS-REFERENCE TO RELATED APPLICATION

This application claims the priority benefits of U.S. provisional application Ser. No. 62/657,937, filed on Apr. 16, 2018, The entirety of the above-mentioned patent applications is hereby incorporated by reference herein and made a part of specification.

BACKGROUND OF THE INVENTION

Field of the Invention

The invention is related to an electronic device, and more particularly, to an electronic device that is labor-saving, convenient to use, and for which accidentally activated does not readily occur on the keyboard during use.

Description of Related Art

Generally, in a commercially-available 2-in-1 notebook computer, in order to switch between the notebook mode and the tablet mode, the display is usually made to pivotally rotate 360 degrees relative to the body.

However, this structural configuration has the following disadvantages to be addressed: (1) when the display needs to be flipped relative to the body, the user must flip the entire notebook computer, which is laborious to use; (2) when the display needs to be flipped relative to the body, in order to prevent a connection line of an external device from being entangled due to the flipping, the user must remove the connection lines of all of the external devices, which is inconvenient to use; (3) for a notebook computer in tablet mode, when the body is placed on the desktop, the keyboard is readily accidentally activated.

SUMMARY OF THE INVENTION

The invention provides an electronic device that solves the issues of being laborious, inconvenient to use and for which the keyboard is readily accidentally activated during use.

An electronic device of the invention includes a first component, a second component, a dual axis module, and a third component. The second component is flipably disposed at the first component. The dual axis module has a first shaft and a second shaft. The second component is pivoted to the second shaft. The third component is pivoted to the first shaft. The electronic device is switched between a first state, a second state, a third state, and a fourth state. During the switching of the first state to the second state, the first shaft is rotatable relative to the first component and the second shaft is non-rotatable. During the switching of the second state to the third state, the first shaft is non-rotatable and the second shaft is rotatable relative to the first component. During the switching of the third state to the fourth state, the first shaft is rotatable relative to the first component and the second shaft is non-rotatable.

In an embodiment of the invention, during the process of switching the first state to the second state, the first shaft is rotated by a first amount of rotation. The first amount of rotation is greater than 0 degrees and less than or equal to 135 degrees.

In an embodiment of the invention, during the process of switching the second state to the third state, the second shaft is rotated by a second amount of rotation. The second amount of rotation is equal to 180 degrees.

In an embodiment of the invention, during the process of switching the third state to the fourth state, the first shaft is rotated by a third amount of rotation. The third amount of rotation is greater than or equal to 45 degrees and less than 180 degrees.

In an embodiment of the invention, two opposite sides of the second component have a first wall and a second wall. In the first state, the second component is superimposed on the first component via the first wall, and the third component is superimposed on the first component and the second component.

In an embodiment of the invention, in the second state, the second component is superimposed on the first component via the first wall, the third component is away from the second wall of the second component, and there is an angle between a surface of the third component and the second wall of the second component.

In an embodiment of the invention, the third component is a display, and the surface is a display surface of the display.

In an embodiment of the invention, in the third state, the second component is superimposed on the first component via the second wall, the third component is away from the second wall of the second component, and there is the angle between the surface of the third component and the second wall of the second component.

In an embodiment of the invention, in the fourth state, the second component is superimposed on the first component via the second wall, and the third component is moved closer to the first wall of the second component.

In an embodiment of the invention, the first component has a first side and a second side opposite to each other. The second component has a third side and a fourth side opposite to each other. The third component has a fifth side and a sixth side opposite to each other. The second component is flipably disposed at the first component via the third side. The second component is pivoted to the second shaft of the dual axis module via the fourth side. The third component is pivoted to the first shaft of the dual axis module via the sixth side. In the first state, the second component is superimposed on the first component, the fourth side of the second component is located at the second side of the first component, the third component is superimposed on the first component and the second component, and the fifth side of the third component is located at the first side of the first component.

In an embodiment of the invention, in the second state, the fifth side of the third component is away from the first side of the first component, and there is an angle between a surface of the third component and the second component.

In an embodiment of the invention, in the third state, the second component is superimposed on the first component, the fourth side of the second component is located at the first side of the first component, there is the angle between the surface of the third component and the second component, and the sixth side of the third component is located at the first side of the first component.

In an embodiment of the invention, in the fourth state, the second component is superimposed on the first component, the fourth side of the second component is located at the first side of the first component, the third component is moved closer to the second component, and the fifth side of the third component is located at the second side of the first component.

In an embodiment of the invention, the electronic device further includes a flexible connecting member. The flexible connecting member is disposed at the first component and the second component, such that the second component may be flipped relative to the first component.

In an embodiment of the invention, the electronic device further includes a pivot shaft module. The pivot shaft module has a third shaft and a fourth shaft. The third shaft is pivoted to the first component and the fourth shaft is pivoted to the second component, such that the second component may be flipped relative to the first component.

In an embodiment of the invention, the first component includes a body and an accommodation groove. The accommodation groove is disposed in the body. The second component is flipably accommodated in the accommodation groove or flipped out of the accommodation groove.

In an embodiment of the invention, in the first state and the second state, the second component is accommodated in the accommodation groove. In the third state and the fourth state, the second component is moved out of the accommodation groove and superimposed on the body.

Based on the above, the electronic device of the invention may be labor-saving, convenient to use, and the keyboard is not readily accidentally activated during use.

In order to make the aforementioned features and advantages of the disclosure more comprehensible, embodiments accompanied with figures are described in detail below.

DESCRIPTION OF THE EMBODIMENTS

Figure 1:
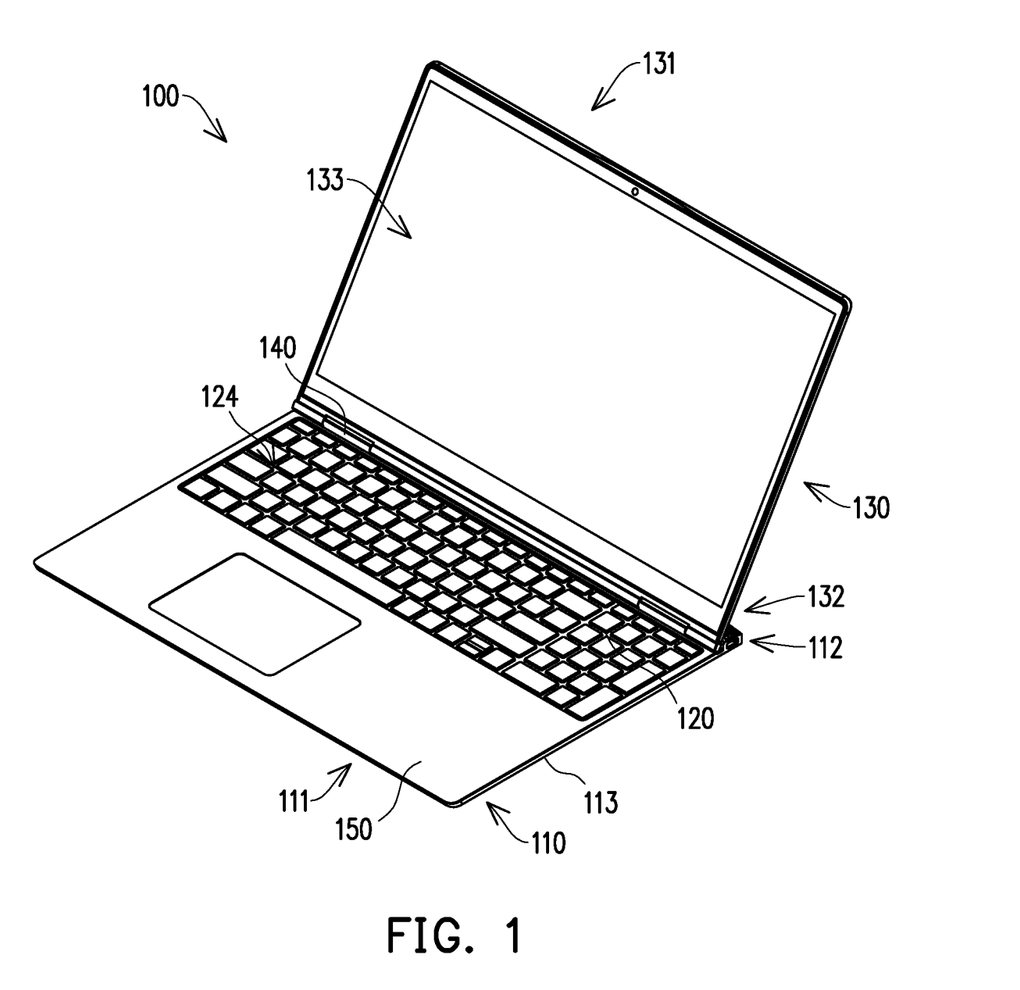
FIG. 1 is a perspective schematic view of an electronic device of an embodiment of the invention.
Figure 2A:
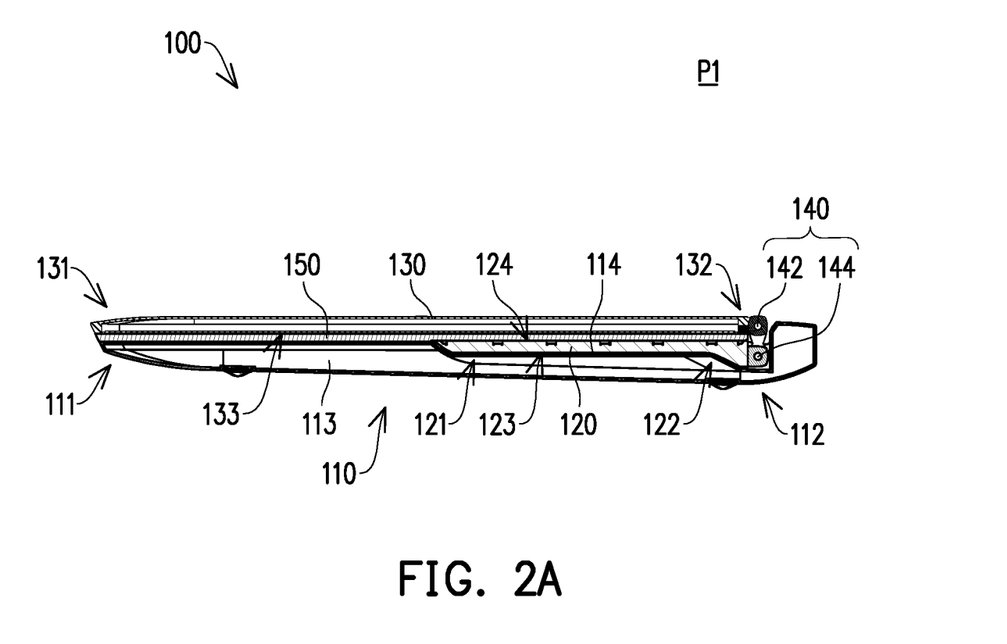
FIG. 2A to FIG. 2E show the process of the electronic device of FIG. 1 switching between different states.

FIG. 1 is a perspective schematic view of an electronic device of an embodiment of the invention. FIG. 2A to FIG. 2E show the process of the electronic device of FIG. 1 switching between different states. Referring to FIG. 1 and FIG. 2A, an electronic device 100 of the present embodiment includes a first component 110, a second component 120, a third component 130, a dual axis module 140, and a flexible connecting member 150. The flexible connecting member 150 is disposed at the first component 110 and the second component 120, such that the second component 120 may be flipped relative to the first component 110. The second component 120 and the third component 130 are both pivoted to the dual axis module 140, such that the third component 130 may be pivotally rotated relative to the second component 120.

Specifically, the first component 110 has a first side 111 and a second side 112 opposite to each other, a body 113, and an accommodation groove 114. The accommodation groove 114 is disposed at the second side 112 of the body 113. The flexible connecting member 150 is disposed at the first side 111 of the body 113.

On the other hand, the second component 120 has a third side 121, a fourth side 122, a first wall 123, and a second wall 124. The flexible connecting member 150 is disposed at the second wall 124 of the second component 120, such that the third side 121 of the second component 120 is flipably disposed at the first component 110, and therefore the second component 120 is flipped and accommodated in the accommodation groove 114 or flipped out of the accommodation groove 114.

As shown in FIG. 1, the second component 120 is, for example, a component having a keyboard. The flexible connecting member 150 exposes the keyboard of the second component 120 to facilitate a user to input a command.

For example, the flexible connecting member 150 may be a flexible material such as leather that acts as a flexible rotating shaft allowing the second component 120 to be flipped relative to the first component 110. The material of the flexible connecting member 150 is not limited.

Referring to FIG. 1 and FIG. 2A, the third component 130 has a fifth side 131, a sixth side 132, and a surface 133. The third component 130 is, for example, a display, and the surface 133 is a display surface of the display.

Moreover, the dual axis module 140 has a first shaft 142 and a second shaft 144. The second component 120 is pivoted to the second shaft 144 of the dual axis module 140 via the fourth side 122. The third component 130 is pivoted to the first shaft 142 of the dual axis module 140 via the sixth side 132.

Figure 2B:
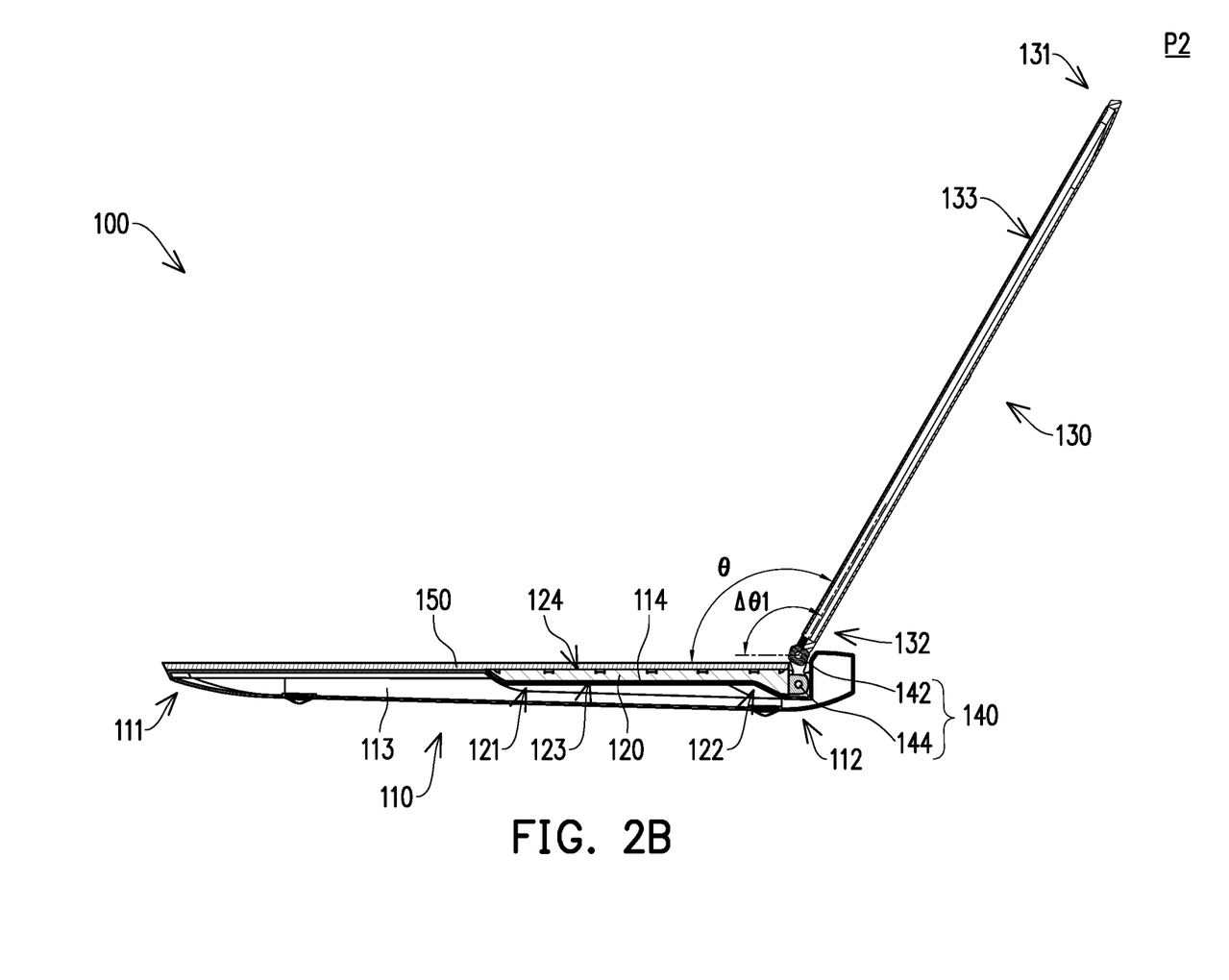
Figure 2C:
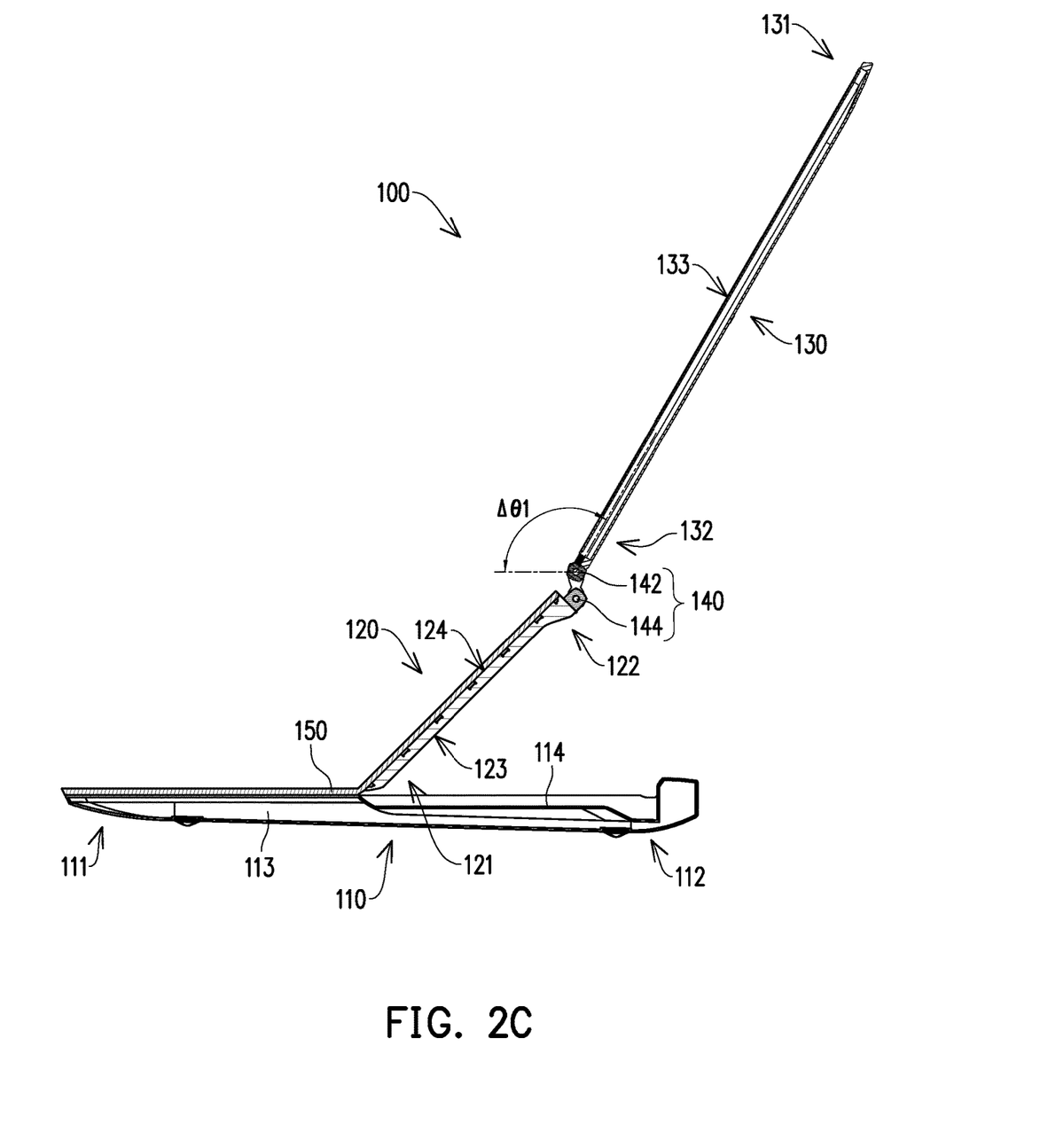
Figure 2D:
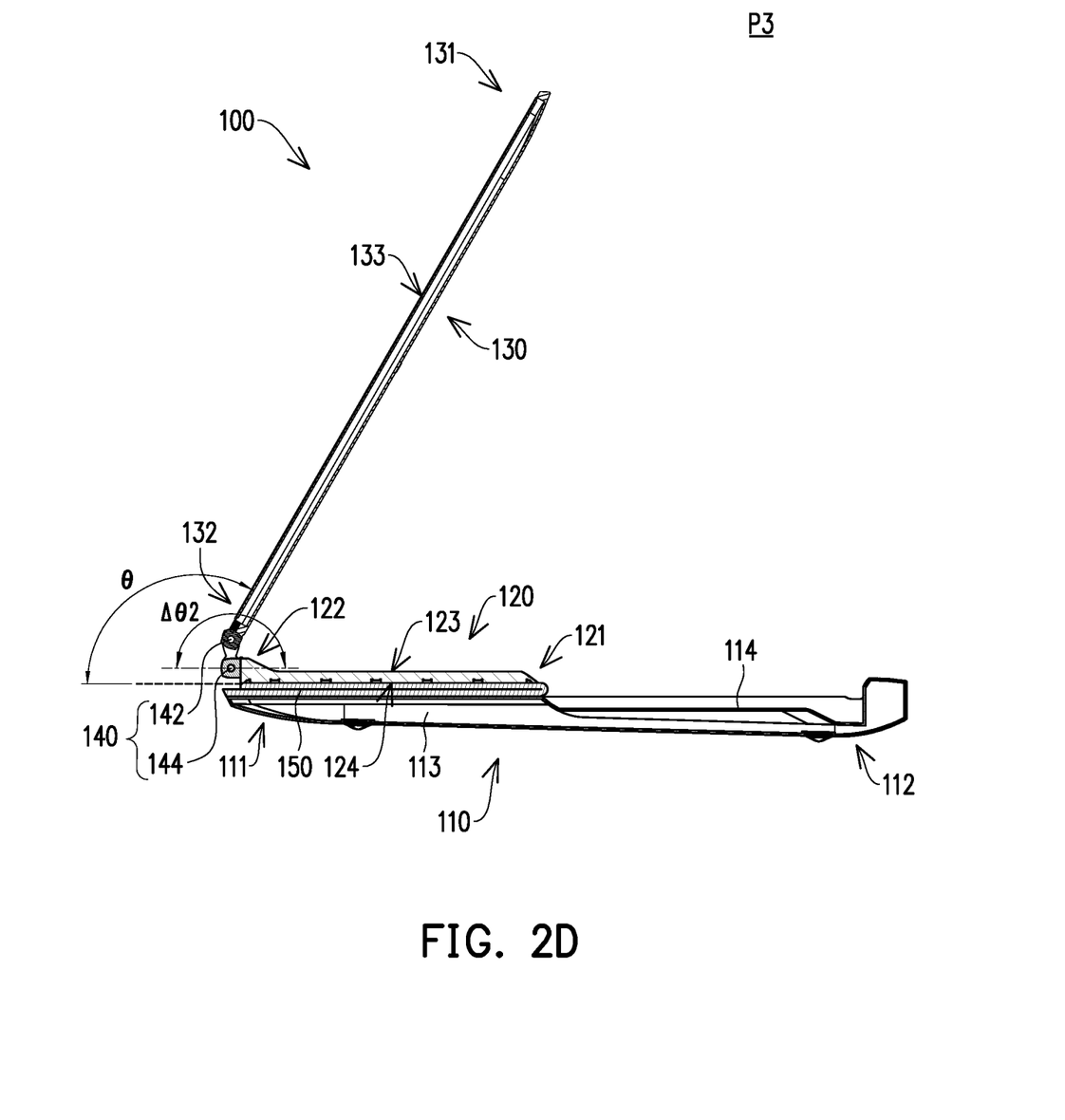
Figure 2E:
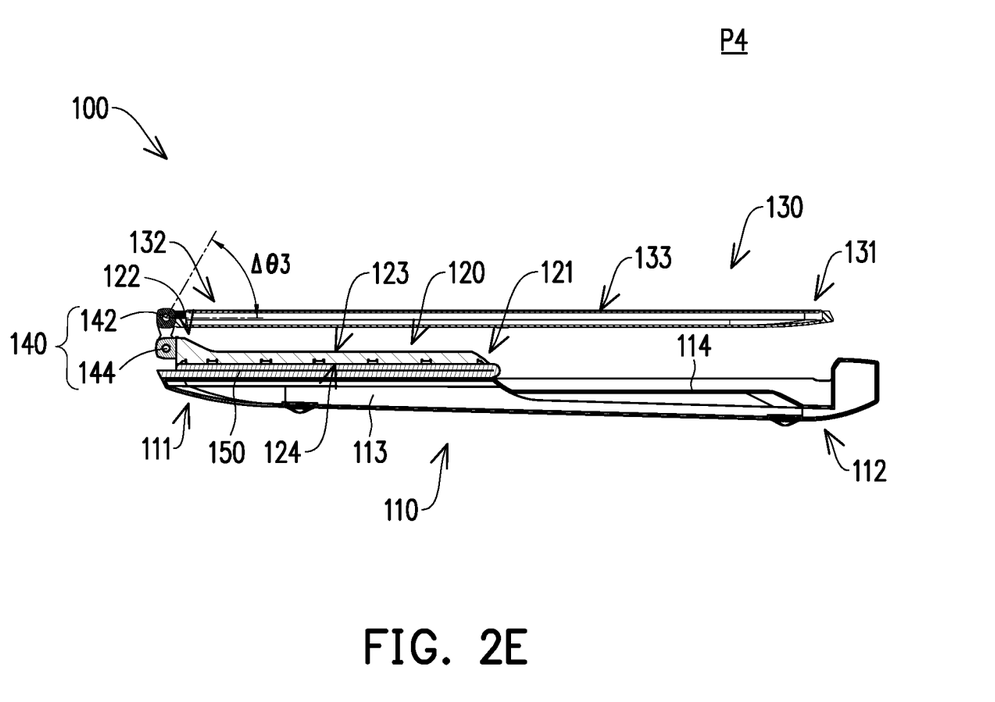
Figure 3A:
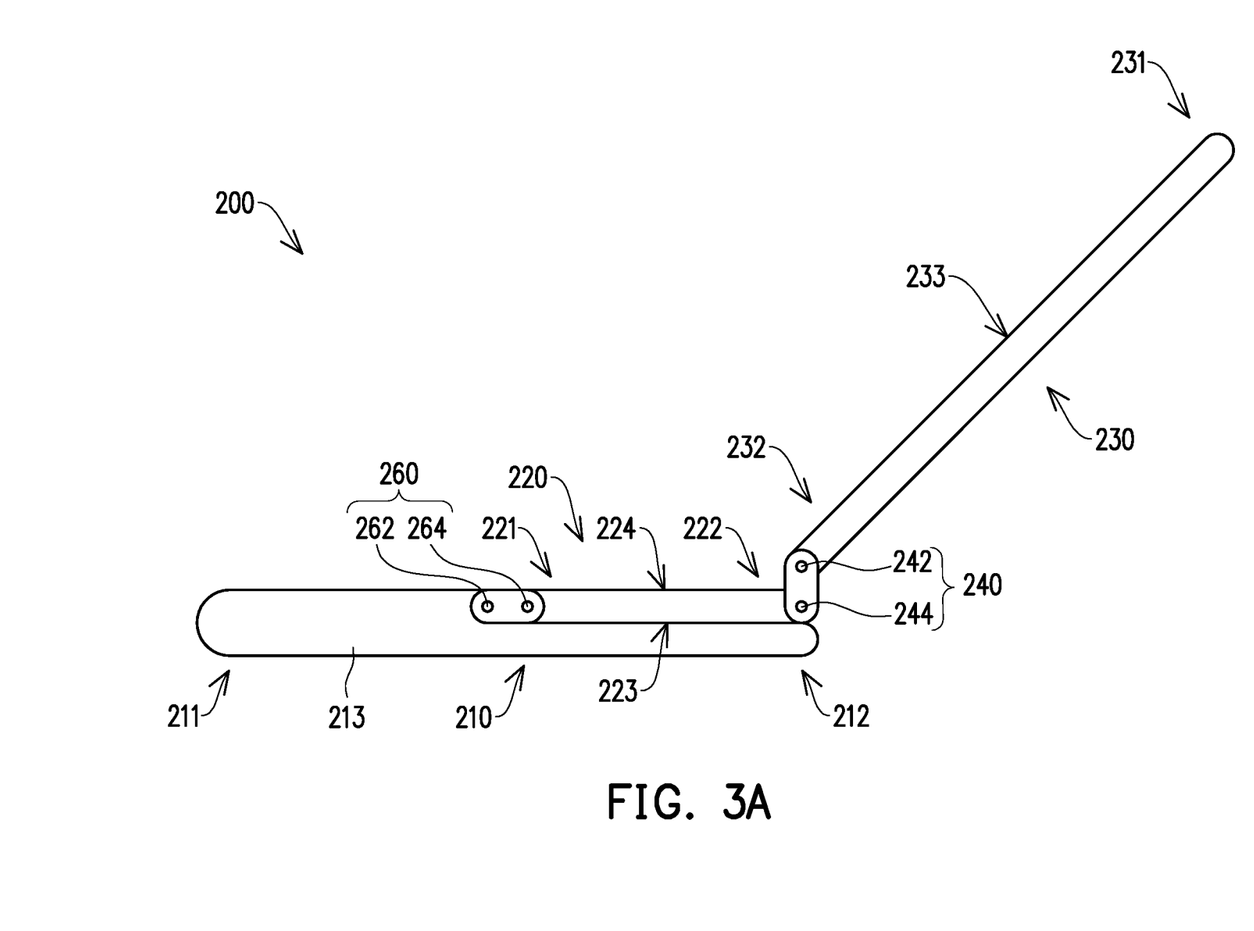
FIG. 3A to FIG. 3D show a process in which an electronic device of another embodiment of the invention is switched between different states.
Figure 3B:
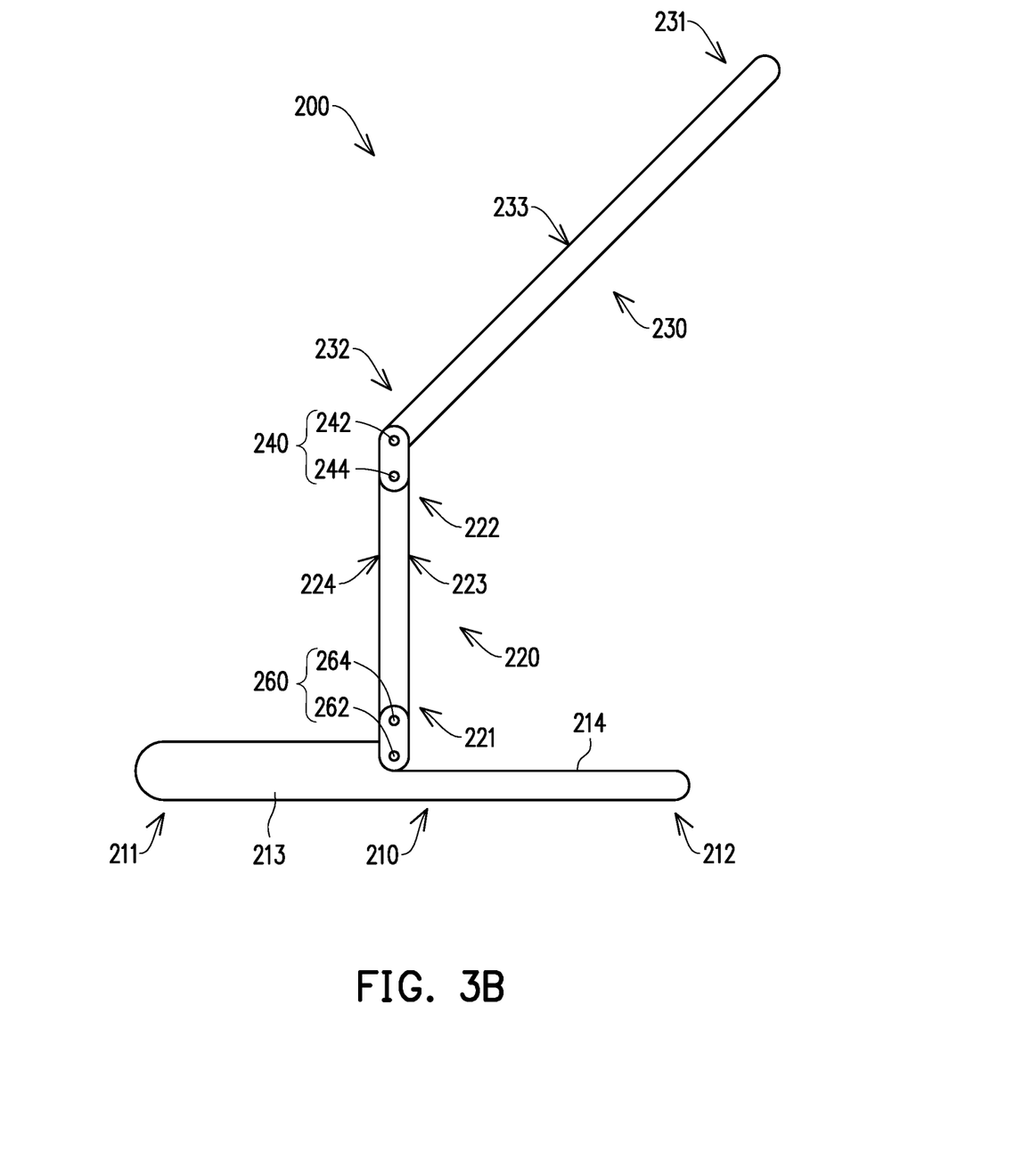
Figure 3C:
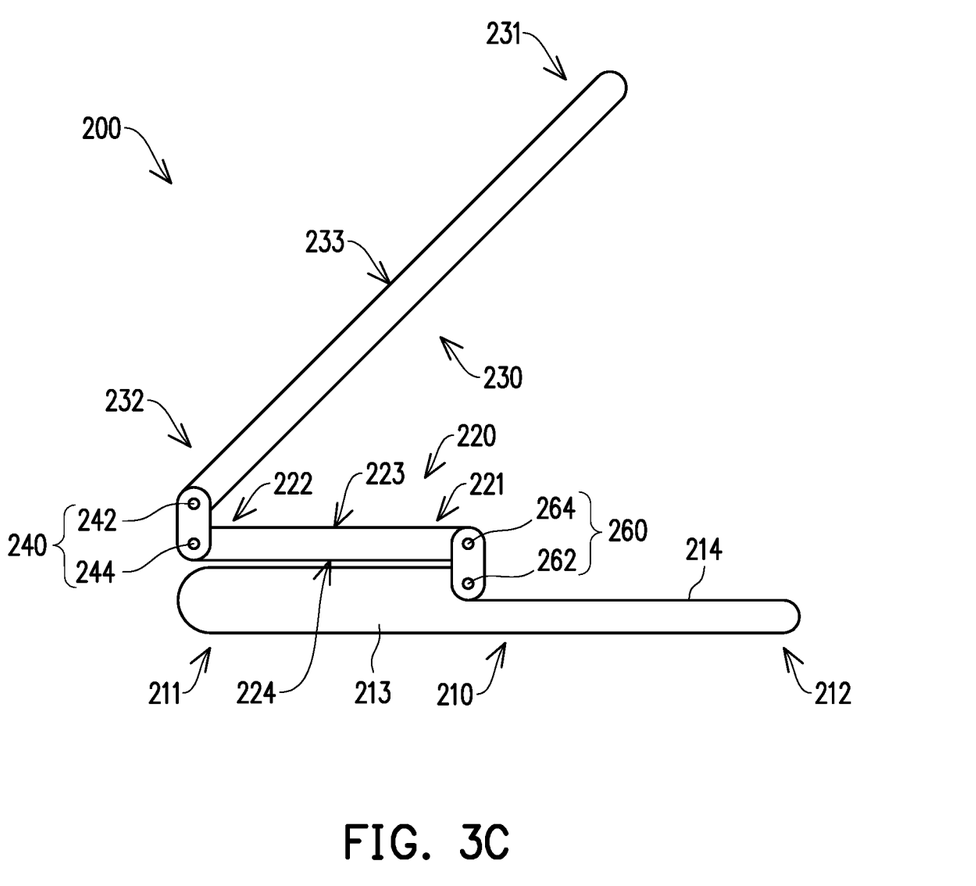
Figure 3D:
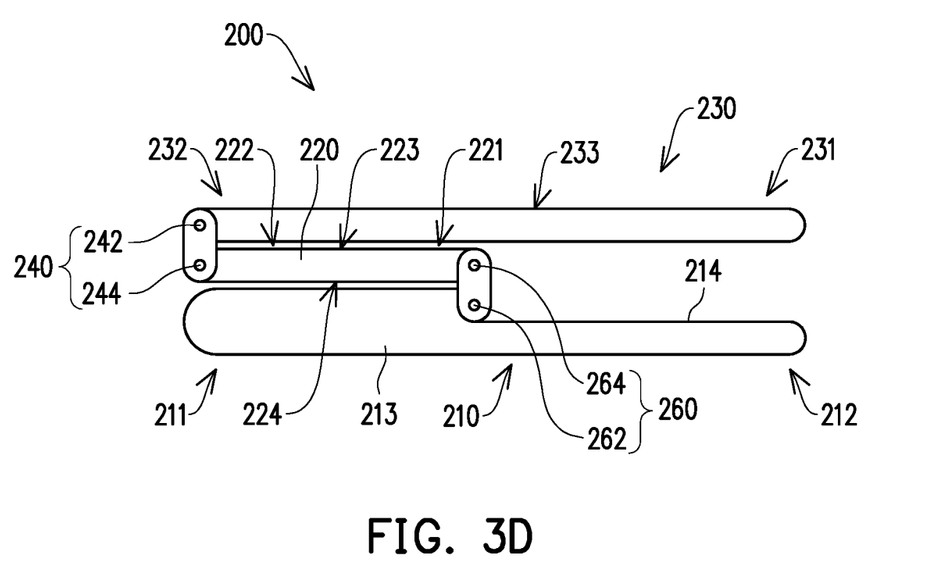

The state of the electronic device 100 shown in FIG. 2A is defined as a first state P1. The state of the electronic device 100 shown in FIG. 2B is defined as a second state P2. The state of the electronic device 100 shown in FIG. 2D is defined as a third state P3, wherein the electronic device 100 of the state shown in FIG. 2C is in a transition state between the second state P2 and the third state P3. The state of the electronic device 100 shown in FIG. 2E is defined as a fourth state P4.

Referring to FIG. 1 and FIG. 2A, in the first state P1, the second component 120 is accommodated in the accommodation groove 114 of the first component 110. The second component 120 is superimposed on the first component 110 via the first wall 123. The fourth side 122 of the second component 120 is located at the second side 112 of the first component 110.

On the other hand, the third component 130 is indirectly superimposed on the first component 110 via the flexible connecting member 150. The third component 130 is indirectly superimposed on the second wall 124 of the second component 120 via the flexible connecting member 150. The fifth side 131 of the third component 130 is located at the first side 111 of the first component 110.

In the process of switching the electronic device 100 from the first state P1 shown in FIG. 2A to the second state P2 shown in FIG. 2B, the first shaft 242 of the dual axis module 240 may be rotated relative to the first component 110, and a second shaft 244 of the dual axis module 240 is stopped.

For example, when the electronic device 100 is switched from the first state P1 to the second state P2, the first shaft 242 of the dual axis module 240 is rotated by a first amount of rotation $\Delta\theta1$. The first amount of rotation $\Delta\theta1$ is greater than 0 degrees and less than or equal to 135 degrees. The first amount of rotation $\Delta\theta1$ may be, for example, 10, 20, 30, 40, 50, 60, 70, 80, 90, 100, 110, 120, 130, or 135 degrees. The actual first amount of rotation $\Delta\eta1$ depends on the demand. There is no limit to the value of the first amount of rotation $\Delta\theta1$.

Referring to FIG. 1 and FIG. 2B, in the second state P2, the second component 120 is still accommodated in the accommodation groove 114 of the first component 110. The second component 120 is still superimposed on the first component 110 via the first wall 123.

However, the fifth side 131 of the third component 130 is away from the first side 111 of the first component 110. At this time, the surface 133 of the third component 130 has an angle θ with respect to the second wall 124 of the second component 120.

In the process of switching the electronic device 100 from the second state P2 shown in FIG. 2B to the third state P3 shown in FIG. 2D, the first shaft 242 of the dual axis module 240 is stopped, and the second shaft 244 of the dual axis module 240 may be rotated relative to the first component 110.

For example, when the electronic device 100 is switched from the second state P2 to the third state P3, the second shaft 244 of the dual axis module 240 is rotated by a second amount of rotation Δθ2. The second amount of rotation Δθ2 is equal to about 180 degrees. The actual second amount of rotation Δθ2 depends on the demand. There is no limit to the value of the second amount of rotation Δθ2.

Referring to FIG. 1 and FIG. 2D, in the third state P3, the second component 120 is moved out of the accommodation groove 114 of the first component 110. The second component 120 is indirectly superposed on the body 113 of the first component 110 via the flexible connector 150 through the second wall 124.

At this point, the fifth side 131 of the third component 130 is still away from the first side 111 of the first component 110. The surface 133 of the third component 130 still has the angle θ with respect to the second wall 124 of the second component 120.

However, the fourth side 122 of the second component 120 is located at the first side 111 of the first component 110, and the sixth side 132 of the third component 130 is located at the first side 111 of the first component 110.

In the process of switching the electronic device 100 from the third state P3 shown in FIG. 2D to the fourth state P4 shown in FIG. 2E, the first shaft 242 of the dual axis module 240 may be rotated relative to the first component 110, and the second shaft 244 of the dual axis module 240 is stopped.

For example, when the electronic device 100 is switched from the third state P3 to the fourth state P4, the first shaft 242 of the dual axis module 240 is rotated by a third amount of rotation Δθ3. The third amount of rotation Δθ3 is greater than or equal to 45 degrees and less than 180 degrees. The third amount of rotation Δθ3 may be, for example, 45, 50, 60, 70, 80, 90, 100, 110, 120, 130, 140, 150, 160, 170, or 180 degrees. The actual third amount of rotation Δθ3 depends on the demand. There is no limit to the value of the third amount of rotation Δθ3.

Referring to FIG. 1 and FIG. 2E, in the fourth state P4, the second component 120 is still indirectly superimposed on the body 113 of the first component 110 via the flexible connecting member 150 through the second wall 124.

At this point, the fourth side 122 of the second component 120 is still located at the first side 111 of the first component 110, and the sixth side 132 of the third component 130 is still located at the first side 111 of the first component 110.

However, the third component 130 is moved closer to the first wall 123 of the second component 120, and the fifth side 130 of the third component 130 is located at the second side 112 of the first component 110. The second component 120 is located between the first component 110 and the third component 130.

In addition, in the electronic device 100 of the fourth state P4, the accommodation groove 114 may be used as a heat dissipation space, thereby improving the heat dissipation effect of the electronic device 100.

With the above configuration, the electronic device 100 may be switched between the first state P1, the second state P2, the third state P3, and the fourth state P4. In the process, the first component 110 may be kept flat on a specific platform (e.g., a desktop). Therefore, the user does not need to pick up the entire electronic device 100, which is labor-saving.

In addition, since the first component 110 may be kept flat on a specific platform (for example, a desktop), a connection line inserted in an external device of the body 113 is not entangled from the switching of the electronic device 100 between different states, and therefore the connection line of the external device may still be inserted onto the body 113 of the electronic device 100, which is quite convenient in use.

Furthermore, when the electronic device 100 is in the fourth state P4, the second component 120 is located between the first component 110 and the third component 130, and the keyboard is not readily accidentally activated.

FIG. 3A to FIG. 3D show a process in which an electronic device of another embodiment of the invention is switched between different states. In an electronic device 200 of the embodiment shown in FIG. 3A, FIG. 3B, FIG. 3C, and FIG. 3D, the configuration and operation of a first component 210, a first side 211, a second side 212, a body 213, an accommodation groove 214, a second component 220, a third side 221, a fourth side 222, a first wall 223, a second wall 224, a third component 230, a fifth side 231, a sixth side 232, a surface 233, a dual axis module 240, a first shaft 242, and a second shaft 244 are the same as the configuration and operation of the first component 110, the first side 111, the second side 112, the body 113, the accommodation groove 114, the second component 120, the third side 121, the fourth side 122, the first wall 123, the second wall 124, the third component 130, the fifth side 131, the sixth side 132, the surface 133, the dual axis module 140, the first shaft 142, and the second shaft 144 in the electronic device 100 of the embodiment shown in FIG. 2B, FIG. 2C, FIG. 2D, and FIG. 2E and are not repeated herein.

The electronic device 200 of the embodiment shown in FIG. 3A, FIG. 3B, FIG. 3C, and FIG. 3D differs in that the electronic device 200 further includes a pivot shaft module 260. The pivot shaft module 260 has a third shaft 262 and a fourth shaft 264. The third shaft 262 of the pivot shaft module 260 is pivoted to the first component 210. The fourth shaft 264 of the pivot shaft module 260 is pivoted to the second component 220, such that the second component 220 may be flipped relative to the first component 210. The second component 220 may be directly superimposed on the first component 210 via the second wall 224. The third component 230 may be directly superimposed on the first component 210. The third component 230 may be directly superimposed on the second wall 224 of the second component 220.

Based on the above, the electronic device may be switched between the first state, the second state, the third state, and the fourth state. The first component may be kept flat on a specific platform (e.g., a desktop). Therefore, the user does not need to pick up the entire electronic device, which is labor-saving.

In addition, since the first component may be kept flat on a specific platform (for example, a desktop), the connection line inserted in the external device of the body is not entangled from the switching of the electronic device between different states, and therefore the connection line of the external device may still be inserted onto the body of the electronic device, which is quite convenient in use.

Furthermore, when the electronic device is in the fourth state, the second component is located between the first component and the third component, and the keyboard is not readily accidentally activated.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An electronic device, comprising:
   a first component;
   a second component, flipably disposed at the first component;
   a dual axis module, having a first shaft and a second shaft, and the second component is pivoted to the second shaft; and
   a third component, pivoted to the first shaft,
   wherein the electronic device is switched between a first state, a second state, a third state, and a fourth state, in a process of switching the first state to the second state, the first shaft is rotatable relative to the first component and the second shaft is non-rotatable, in a process of switching the second state to the third state, the first shaft is non-rotatable and the second shaft is rotatable relative to the first component, and in a process of switching the third state to the fourth state, the first shaft is rotatable relative to the first component and the second shaft is non-rotatable.

2. The electronic device of claim 1, wherein in the process of switching the first state to the second state, the first shaft is rotated by a first amount of rotation, and the first amount of rotation is greater than 0 degrees and less than or equal to 135 degrees.

3. The electronic device of claim 1, wherein in the process of switching the second state to the third state, the second shaft is rotated by a second amount of rotation, and the second amount of rotation is equal to 180 degrees.

4. The electronic device of claim 1, wherein in the process of switching the third state to the fourth state, the first shaft is rotated by a third amount of rotation, and the third amount of rotation is greater than or equal to 45 degrees and less than 180 degrees.

5. The electronic device of claim 1, wherein two opposite sides of the second component have a first wall and a second wall, and in the first state, the second component is superimposed on the first component via the first wall, and the third component is superimposed on the first component and the second component.

6. The electronic device of claim 5, wherein in the second state, the second component is superimposed on the first component via the first wall, the third component is away from the second wall of the second component, and there is an angle between a surface of the third component and the second wall of the second component.

7. The electronic device of claim 6, wherein the third component is a display, and the surface is a display surface of the display.

8. The electronic device of claim 6, wherein in the third state, the second component is superimposed on the first component via the second wall, the third component is away from the second wall of the second component, and there is the angle between the surface of the third component and the second wall of the second component.

9. The electronic device of claim 8, wherein in the fourth state, the second component is superimposed on the first component via the second wall, and the third component is moved closer to the first wall of the second component.

10. The electronic device of claim 1, wherein the first component has a first side and a second side opposite to each other, the second component has a third side and a fourth side opposite to each other, the third component has a fifth side and a sixth side opposite to each other, the second component is flipably disposed at the first component via the third side, the second component is pivoted to the second shaft of the dual axis module via the fourth side, the third component is pivoted to the first shaft of the dual axis module via the sixth side, and in the first state, the second component is superimposed on the first component, the fourth side of the second component is located at the second side of the first component, the third component is superimposed on the first component and the second component, and the fifth side of the third component is located at the first side of the first component.

11. The electronic device of claim 10, wherein in the second state, the fifth side of the third component is away from the first side of the first component, and there is an angle between a surface of the third component and the second component.

12. The electronic device of claim 11 wherein in the third state, the second component is superimposed on the first component, the fourth side of the second component is located at the first side of the first component, there is the angle between the surface of the third component and the second component, and the sixth side of the third component is located at the first side of the first component.

13. The electronic device of claim 12, wherein in the fourth state, the second component is superimposed on the first component, the fourth side of the second component is located at the first side of the first component, the third component is moved closer to the second component, and the fifth side of the third component is located at the second side of the first component.

14. The electronic device of claim 1, further comprising:
    a flexible connecting member, disposed at the first component and the second component, such that the second component may be flipped relative to the first component.

15. The electronic device of claim 1, further comprising:
    a pivot shaft module, having a third shaft and a fourth shaft, wherein the third shaft is pivoted to the first component and the fourth shaft is pivoted to the second component, such that the second component may be flipped relative to the first component.

16. The electronic device of claim 1, wherein the first component comprises:
    a body; and
    an accommodation groove, disposed in the body, wherein the second component is flippable to be accommodated in the accommodation groove or flipped out of the accommodation groove.

17. The electronic device of claim 16, wherein in the first state and the second state, the second component is accommodated in the accommodation groove, and in the third state and the fourth state, the second component is moved out of the accommodation groove and superimposed on the body.

* * * * *